US011495214B2

(12) United States Patent
Shin et al.

(10) Patent No.: US 11,495,214 B2
(45) Date of Patent: Nov. 8, 2022

(54) ARTIFICIAL INTELLIGENCE DEVICE FOR PROVIDING VOICE RECOGNITION SERVICE AND METHOD OF OPERATING THE SAME

(71) Applicant: LG ELECTRONICS INC., Seoul (KR)

(72) Inventors: Wonho Shin, Seoul (KR); Jichan Maeng, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 681 days.

(21) Appl. No.: 16/559,021

(22) Filed: Sep. 3, 2019

(65) Prior Publication Data
US 2019/0392819 A1 Dec. 26, 2019

(30) Foreign Application Priority Data
Jul. 29, 2019 (KR) .......................... 10-2019-0091973

(51) Int. Cl.
*G10L 15/16* (2006.01)
*G10L 15/01* (2013.01)
*G10L 15/02* (2006.01)
*G10L 15/22* (2006.01)
*G06K 9/62* (2022.01)

(52) U.S. Cl.
CPC ............ *G10L 15/16* (2013.01); *G06K 9/6256* (2013.01); *G10L 15/01* (2013.01); *G10L 15/02* (2013.01); *G10L 15/22* (2013.01); *G10L 2015/223* (2013.01); *G10L 2015/225* (2013.01); *G10L 2015/227* (2013.01)

(58) Field of Classification Search
None
See application file for complete search history.

(56) References Cited

U.S. PATENT DOCUMENTS

| 6,233,545 | B1* | 5/2001 | Datig ................... G06N 3/004 706/62 |
| 10,692,499 | B2* | 6/2020 | Lim ..................... G10L 15/18 |
| 10,803,863 | B2* | 10/2020 | Ro ........................ G06F 3/167 |
| 11,037,548 | B2* | 6/2021 | Kim ..................... G10L 15/063 |
| 11,330,384 | B2* | 5/2022 | Lee ...................... G10L 25/51 |
| 2009/0276419 | A1* | 11/2009 | Jones ................. G06F 16/3322 707/999.005 |
| 2015/0032451 | A1* | 1/2015 | Gunn .................... G10L 15/20 704/244 |
| 2021/0358496 | A1* | 11/2021 | Sukumar .............. G10L 15/08 |

* cited by examiner

*Primary Examiner* — Isaac Tuku Tecklu
(74) *Attorney, Agent, or Firm* — Birch, Stewart, Kolasch & Birch, LLP

(57) ABSTRACT

An artificial intelligence device for providing a voice recognition service includes a microphone configured to receive a voice command, a memory configured to store an error analysis model for inferring an error cause of voice recognition, an output unit, and a processor configured to determine whether voice recognition of the voice command has failed based on the voice command and voice recognition surrounding information, acquire the error cause from the voice recognition surrounding information using the error analysis model, and output the acquired error cause through the output unit.

18 Claims, 6 Drawing Sheets

600

| DISTANCE | NETWORK ENVIRONMENT | SNR | FAILURE OR SUCCESS | ERROR CAUSE |
|---|---|---|---|---|
| 1m | NORMAL CONNECTION | 1 | FAILURE | AMBIENT NOISE |
| 1m | ABNORMAL CONNECTION | 10 | FAILURE | NETWORK ENVIRONMENT |
| 5m | NORMAL CONNECTION | 9 | FAILURE | DISTANCE |
| 0.5m | NORMAL CONNECTION | 11 | SUCCESS | NONE |
| ... | ... | ... | ... | ... |

610 — row 1
630 — row 2

| ERROR CAUSE | GUIDE VOICE |
|---|---|
| AMBIENT NOISE | AMBIENT NOISE IS TOO LOUD. PLEASE SPEAK AGAIN. |
| NETWORK ENVIRONMENT | PLEASE CHECK A NETWORK CONNECTION STATE. |
| DISTANCE | THE DISTANCE BETWEEN THE USER AND THE DEVICE IS TOO LARGE. PLEASE SPEAK AGAIN AT A CLOSE RANGE. |

ARTIFICIAL INTELLIGENCE DEVICE FOR PROVIDING VOICE RECOGNITION SERVICE AND METHOD OF OPERATING THE SAME

CROSS-REFERENCE TO RELATED APPLICATIONS

Pursuant to 35 U.S.C. § 119(a), this application claims the benefit of an earlier filing date and priority to Korean Application No. 10-2019-0091973 filed in the Republic of Korea on Jul. 29, 2019, the contents of which are incorporated by reference herein in its entirety.

BACKGROUND OF THE INVENTION

Field of the Invention

The present invention relates to an artificial intelligence device capable of providing a voice recognition service.

Discussion of the Related Art

Recently, devices for receiving images or sounds to perform control are increasing. For example, a self-driving device recognizes and analyzes received data and controls movement according to a situation. Smartphones or security devices also receive images, sounds, etc. to determine whether a user is registered. In addition, devices having a voice recognition function recognize and analyze voice to perform control suitable for the intention of the voice.

However, devices for receiving current voice to perform control cannot determine whether the input data is accurately recognized, and may provide only feedback (e.g., "Please input again") indicating that recognition has failed or may not even provide a response when recognition has failed. When a device outputs feedback indicating that recognition has failed or does not output a response, a user may feel frustrated when using a voice recognition service, thereby causing inconvenience.

SUMMARY OF THE INVENTION

Accordingly, an object of the present invention is to provide an artificial intelligence device capable of grasping a voice recognition error cause and guiding countermeasures against the determined error cause.

Another object of the present invention is to provide an artificial intelligence device capable of collecting surrounding information and accurately determining an error cause of voice recognition at the time of voice recognition.

An artificial intelligence device according to an embodiment of the present invention acquires an error cause from voice recognition surrounding information and outputs the acquired error cause, when voice recognition of a voice command has failed based on the voice command and the voice recognition surrounding information.

Further, an artificial intelligence device according to an embodiment of the present invention determines an error cause causing voice recognition failure from the voice recognition surrounding information through an error analysis model learned through a deep learning algorithm or a machine learning algorithm.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE EMBODIMENTS

<Artificial Intelligence (AI)>

Figure 1:
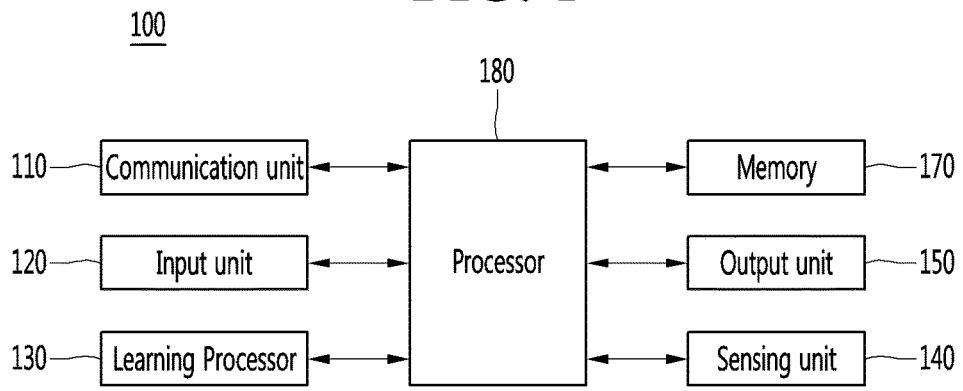
FIG. 1 is a view showing an artificial intelligence (AI) device according to an embodiment of the present invention.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

In addition, an artificial neural network (ANN) is a model used in machine learning and means a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

Further, the artificial neural network may include an input layer, an output layer, and optionally one or more hidden layers. Each layer includes one or more neurons, and the artificial neural network may include a synapse that links neurons to neurons. In the artificial neural network, each neuron can output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network is to determine the model parameters that minimize a loss function. In more detail, the loss function can be used as an index to determine optimal model parameters in the learning process of the artificial neural network.

In addition, machine learning can be classified into supervised learning, unsupervised learning, and reinforcement learning according to a learning method. The supervised learning refers to a method of learning an artificial neural network when a label for learning data is given, and the label means the correct answer (or result value) that the artificial neural network must infer when the learning data is input to the artificial neural network. The unsupervised learning may also refer to a method of learning an artificial neural network when a label for learning data is not given.

The reinforcement learning refers to a learning method in which an agent defined in a certain environment learns to select a behavior or a behavior sequence that maximizes cumulative compensation in each state. Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot refers to a machine that automatically processes or operates a given task by its own ability. In particular, a robot having a function of recognizing an environment and performing a self-determination operation can be referred to as an intelligent robot. Robots can also be classified into industrial robots, medical robots, home robots, military robots, and the like according to the use purpose or field.

In addition, the robot includes a driving unit having an actuator or a motor and can perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user. For example, the self-driving includes a technology for maintaining a lane while driving, a technology for automatically adjusting a speed, such as adaptive cruise control, a technique for automatically traveling along a predetermined route, and a technology for automatically setting and traveling a route when a destination is set.

The vehicle includes a vehicle having only an internal combustion engine, a hybrid vehicle having an internal combustion engine and an electric motor together, and an electric vehicle having only an electric motor, and may include not only an automobile but also a train, a motorcycle, and the like. Also, the self-driving vehicle can be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner. The XR technology can be applied to a head-mount display (HIVID), a head-up display (HUD), a mobile phone, a tablet PC, a laptop, a desktop, a TV, a digital signage, and the like. A device to which the XR technology is applied may be referred to as an XR device.

Next, FIG. 1 illustrates an AI device 100 according to an embodiment of the present invention. In addition, the AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180. The communication unit 110 can transmit and receive data to and from external devices such as other AI devices 100a to 100e and the AI server 200 by using wire/wireless communication technology. For example, the communication unit 110 can transmit and receive sensor information, a user input, a learning model, and a control signal to and from external devices.

Further, the communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

In addition, the input unit 120 can acquire various kinds of data and may include a camera for inputting a video signal, a microphone for receiving an audio signal, and a user input unit for receiving information from a user. The camera or the microphone can be treated as a sensor, and the signal acquired from the camera or the microphone can be referred to as sensing data or sensor information.

Further, the input unit 120 can acquire a learning data for model learning and an input data to be used when an output is acquired by using learning model, and can also acquire raw input data. In this instance, the processor 180 or the learning processor 130 can extract an input feature by preprocessing the input data.

Also, the learning processor 130 can learn a model composed of an artificial neural network by using learning data. The learned artificial neural network may be referred to as a learning model used to an infer result value for new input data rather than learning data, and the inferred value may be used as a basis for determination to perform a certain operation.

Figure 2:
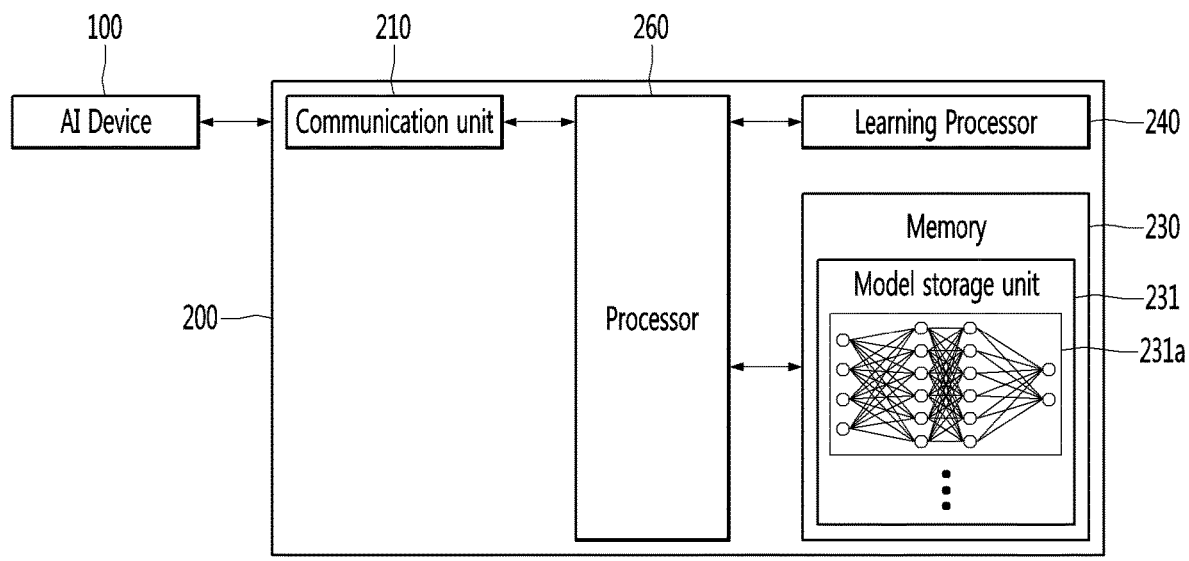
FIG. 2 is a view showing an AI server according to an embodiment of the present invention.

In addition, the learning processor 130 can perform AI processing together with the learning processor 240 of the AI server 200 (see FIG. 2). Also, the learning processor 130 may include a memory integrated or implemented in the AI device 100. Alternatively, the learning processor 130 may be implemented by using the memory 170, an external memory directly connected to the AI device 100, or a memory held in an external device.

Further, the sensing unit 140 can acquire at least one of internal information about the AI device 100, ambient environment information about the AI device 100, and user information by using various sensors. Examples of the sensors included in the sensing unit 140 include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

In addition, the output unit 150 can generate an output related to a visual sense, an auditory sense, or a haptic sense. For example, the output unit 150 may include a display unit for outputting time information, a speaker for outputting auditory information, and a haptic module for outputting haptic information.

Also, the memory 170 stores data that supports various functions of the AI device 100. For example, the memory 170 can store input data acquired by the input unit 120, learning data, a learning model, a learning history, and the like.

Further, the processor 180 determines at least one executable operation of the AI device 100 based on information determined or generated by using a data analysis algorithm or a machine learning algorithm. The processor 180 also controls the components of the AI device 100 to execute the determined operation. For example, the processor 180 can request, search, receive, or utilize data of the learning processor 130 or the memory 170. The processor 180 can also control the components of the AI device 100 to execute the predicted operation or the operation determined to be desirable among the at least one executable operation.

When the connection of an external device is required to perform the determined operation, the processor 180 can generate a control signal for controlling the external device and transmit the generated control signal to the external device. The processor 180 can also acquire intention information for the user input and determine the user's requirements based on the acquired intention information.

In addition, the processor 180 can acquire the intention information corresponding to the user input by using at least one of a speech to text (STT) engine for converting speech input into a text string or a natural language processing (NLP) engine for acquiring intention information of a natural language. At least one of the STT engine or the NLP engine may be configured as an artificial neural network, at least part of which is learned according to the machine learning algorithm. Further, at least one of the STT engine or the NLP engine may be learned by the learning processor 130, may be learned by the learning processor 240 of the AI server 200, or may be learned by their distributed processing.

Also, the processor 180 can collect history information including the operation contents of the AI apparatus 100 or the user's feedback on the operation and store the collected history information in the memory 170 or the learning processor 130 or transmit the collected history information to the external device such as the AI server 200. The collected history information may also be used to update the learning model.

In addition, the processor 180 also controls at least part of the components of AI device 100 so as to drive an application program stored in memory 170. Furthermore, the processor 180 can operate two or more of the components included in the AI device 100 in combination so as to drive the application program.

Next, FIG. 2 illustrates an AI server 200 according to an embodiment of the present invention. Referring to FIG. 2, the AI server 200 refers to a device that learns an artificial neural network by using a machine learning algorithm or uses a learned artificial neural network. The AI server 200 may include a plurality of servers to perform distributed processing, or may be defined as a 5G network. In addition, the AI server 200 may be included as a partial configuration of the AI device 100, and may perform at least part of the AI processing together.

As shown, the AI server 200 may include a communication unit 210, a memory 230, a learning processor 240, a processor 260, and the like. The communication unit 210 can transmit and receive data to and from an external device such as the AI device 100, and the memory 230 may include a model storage unit 231. Further, the model storage unit 231 can store a learning or learned model (or an artificial neural network 231a) through the learning processor 240.

Also, the learning processor 240 can learn the artificial neural network 231a by using the learning data. The learning model may also be used in a state of being mounted on the AI server 200 of the artificial neural network, or may be used in a state of being mounted on an external device such as the AI device 100.

In addition, the learning model may be implemented in hardware, software, or a combination of hardware and software. If all or part of the learning models are implemented in software, one or more instructions that constitute the learning model may be stored in the memory 230. The processor 260 may infer the result value for new input data by using the learning model and may generate a response or a control command based on the inferred result value.

Figure 3:
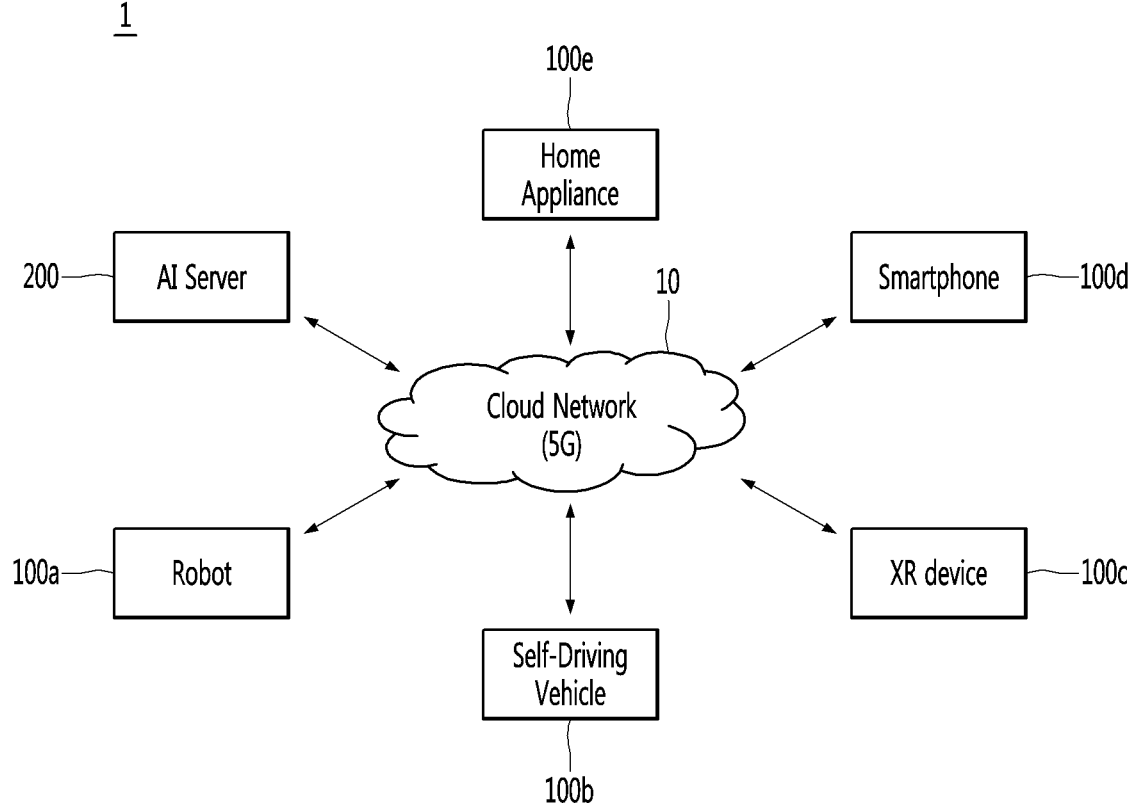
FIG. 3 is a view showing an AI system according to an embodiment of the present invention.

Next, FIG. 3 illustrates an AI system 1 according to an embodiment of the present invention. Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, can be referred to as AI devices 100a to 100e.

Further, the cloud network 10 refers to a network that forms part of a cloud computing infrastructure or exists in a cloud computing infrastructure. The cloud network 10 may be configured by using a 3G network, a 4G or LTE network, or a 5G network. That is, the devices 100a to 100e and 200 configuring the AI system 1 can be connected to each other through the cloud network 10. In particular, each of the devices 100a to 100e and 200 can communicate with each other through a base station, but may directly communicate with each other without using a base station.

In addition, the AI server 200 may include a server that performs AI processing and a server that performs operations on big data. The AI server 200 may also be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

Further, the AI server 200 can learn the artificial neural network according to the machine learning algorithm instead of the AI devices 100a to 100e, and may directly store the learning model or transmit the learning model to the AI devices 100a to 100e. Also, the AI server 200 can receive input data from the AI devices 100a to 100e, infer the result value for the received input data by using the learning model, generate a response or a control command based on the inferred result value, and transmit the response or the control command to the AI devices 100a to 100e.

Alternatively, the AI devices 100a to 100e may infer the result value for the input data by directly using the learning model, and generate the response or the control command based on the inference result. Hereinafter, various embodiments of the AI devices 100a to 100e to which the above-described technology is applied will be described. In addition, the AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like. The robot 100a includes a robot control module for controlling the operation, and the robot control module refers to a software module or a chip implementing the software module by hardware.

In addition, the robot 100a can acquire state information about the robot 100a by using sensor information acquired from various kinds of sensors, detect (recognize) surrounding environment and objects, generate map data, determine the route and the travel plan, determine the response to user interaction, or determine the operation.

The robot 100a can also use the sensor information acquired from at least one sensor among the lidar, the radar, and the camera so as to determine the travel route and the travel plan. Further, the robot 100a can perform the above-described operations by using the learning model composed of at least one artificial neural network. For example, the robot 100a can recognize the surrounding environment and the objects by using the learning model, and determine the operation by using the recognized surrounding information or object information. The learning model may also be learned directly from the robot 100a or be learned from an external device such as the AI server 200.

Further, the robot 100a can perform the operation by generating the result by directly using the learning model, but the sensor information may be transmitted to the external device such as the AI server 200 and the generated result may be received to perform the operation. The robot 100a can also use at least one of the map data, the object information detected from the sensor information, or the object information acquired from the external apparatus to determine the travel route and the travel plan, and control the driving unit such that the robot 100a travels along the determined travel route and travel plan.

In addition, the map data may include object identification information about various objects arranged in the space in which the robot 100a moves. For example, the map data may include object identification information about fixed objects such as walls and doors and movable objects such as pollen and desks. Also, the object identification information may include a name, a type, a distance, and a position.

In addition, the robot 100a can perform the operation or travel by controlling the driving unit based on the control/interaction of the user. Also, the robot 100a can acquire the intention information of the interaction due to the user's operation or speech utterance, determine the response based on the acquired intention information, and perform the operation.

<AI+Self-Driving>

The self-driving vehicle 100b, to which the AI technology is applied, may be implemented as a mobile robot, a vehicle, an unmanned flying vehicle, or the like. The self-driving vehicle 100b may include a self-driving control module for controlling a self-driving function, and the self-driving control module refers to a software module or a chip implementing the software module by hardware. The self-driving control module may also be included in the self-driving vehicle 100b as a component thereof, but may be implemented with separate hardware and connected to the outside of the self-driving vehicle 100b.

Further, the self-driving vehicle 100b can acquire state information about the self-driving vehicle 100b by using sensor information acquired from various kinds of sensors, detect (recognize) surrounding environment and objects, generate map data, determine the route and the travel plan, or determine the operation. Like the robot 100a, the self-driving vehicle 100b can use the sensor information acquired from at least one sensor among the lidar, the radar, and the camera so as to determine the travel route and the travel plan. In particular, the self-driving vehicle 100b can recognize the environment or objects for an area covered by a field of view or an area over a certain distance by receiving the sensor information from external devices, or receive directly recognized information from the external devices.

The self-driving vehicle 100b can also perform the above-described operations by using the learning model composed of at least one artificial neural network. For example, the self-driving vehicle 100b can recognize the surrounding environment and the objects by using the learning model, and determine the traveling movement line by using the recognized surrounding information or object information. The learning model may be learned directly from the self-driving vehicle 100a or may be learned from an external device such as the AI server 200.

Also, the self-driving vehicle 100b can perform the operation by generating the result by directly using the learning model, but the sensor information may be transmitted to the external device such as the AI server 200 and the generated result may be received to perform the operation. The self-driving vehicle 100b can also use at least one of the map data, the object information detected from the sensor information, or the object information acquired from the external apparatus to determine the travel route and the travel plan, and control the driving unit such that the self-driving vehicle 100b travels along the determined travel route and travel plan.

Further, the map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may also include a name, a type, a distance, and a position.

In addition, the self-driving vehicle 100b can perform the operation or travel by controlling the driving unit based on the control/interaction of the user. Also, the self-driving vehicle 100b can acquire the intention information of the interaction due to the user's operation or speech utterance, determine the response based on the acquired intention information, and perform the operation.

<AI+XR>

The XR device 100c, to which the AI technology is applied, may be implemented by a head-mount display (HIVID), a head-up display (HUD) provided in the vehicle, a television, a mobile phone, a smartphone, a computer, a wearable device, a home appliance, a digital signage, a vehicle, a fixed robot, a mobile robot, or the like. The XR device 100c can analyzes three-dimensional point cloud data or image data acquired from various sensors or the external devices, generate position data and attribute data for the three-dimensional points, acquire information about the surrounding space or the real object, and render to output the XR object to be output. For example, the XR device 100c can output an XR object including the additional information about the recognized object in correspondence to the recognized object.

Further, the XR device 100c can perform the above-described operations by using the learning model composed of at least one artificial neural network. For example, the XR device 100c can recognize the real object from the three-dimensional point cloud data or the image data by using the learning model, and provide information corresponding to the recognized real object. The learning model may also be directly learned from the XR device 100c, or may be learned from the external device such as the AI server 200.

In addition, the XR device 100c can perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like. The robot 100a, to which the AI technology and the self-driving technology are applied, refers to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself. Further, the robot 100a and the self-driving vehicle 100b having the self-driving function may use a common sensing method so as to determine at least one of the travel route or the travel plan. For example, the robot 100a and the self-driving vehicle 100b having the self-driving function can determine at least one of the travel route or the travel plan by using the information sensed through the lidar, the radar, and the camera.

Also, the robot 100a that interacts with the self-driving vehicle 100b exists separately from the self-driving vehicle 100b and can perform operations interworking with the self-driving function of the self-driving vehicle 100b or interworking with the user who rides on the self-driving vehicle 100b. In addition, the robot 100a interacting with the self-driving vehicle 100b can control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b can monitor the user boarding the self-driving vehicle 100b, or control the function of the self-driving vehicle 100b through the interaction with the user. For example, when it is determined that the driver is in a drowsy state, the robot 100a can activate the self-driving function of the self-driving vehicle 100b or assist the control of the driving unit of the self-driving vehicle 100b. Further, the function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b can provide information or assist the function to the self-driving vehicle 100b outside the self-driving vehicle 100b. For example, the robot 100a can provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like. The robot 100a, to which the XR technology is applied, refers to a robot that is subjected to control/interaction in an XR image. In this instance, the robot 100a may be separated from the XR device 100c and interwork with each other.

When the robot 100a, which is subjected to control/interaction in the XR image, can acquire the sensor information from the sensors including the camera, the robot 100a or the XR device 100c can generate the XR image based on the sensor information, and the XR device 100c can output the generated XR image. Also, the robot 100a can operate based on the control signal input through the XR device 100c or the user's interaction. For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like. The self-driving driving vehicle 100b, to which the XR technology is applied, refers to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image can acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

In addition, when the XR object is output to the HUD, at least part of the XR object can be output so as to overlap the actual object to which the passenger's gaze is directed. Further, when the XR object is output to the display provided in the self-driving vehicle 100b, at least part of the XR object can be output so as to overlap the object in the screen. For example, the self-driving vehicle 100b can output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, acquires the sensor information from the sensors including the camera, the self-driving vehicle 100b or the XR device 100c can generate the XR image based on the sensor information, and the XR device 100c can output the generated XR image. The self-driving vehicle 100b can also operate based on the control signal input through the external device such as the XR device 100c or the user's interaction.

Figure 4:
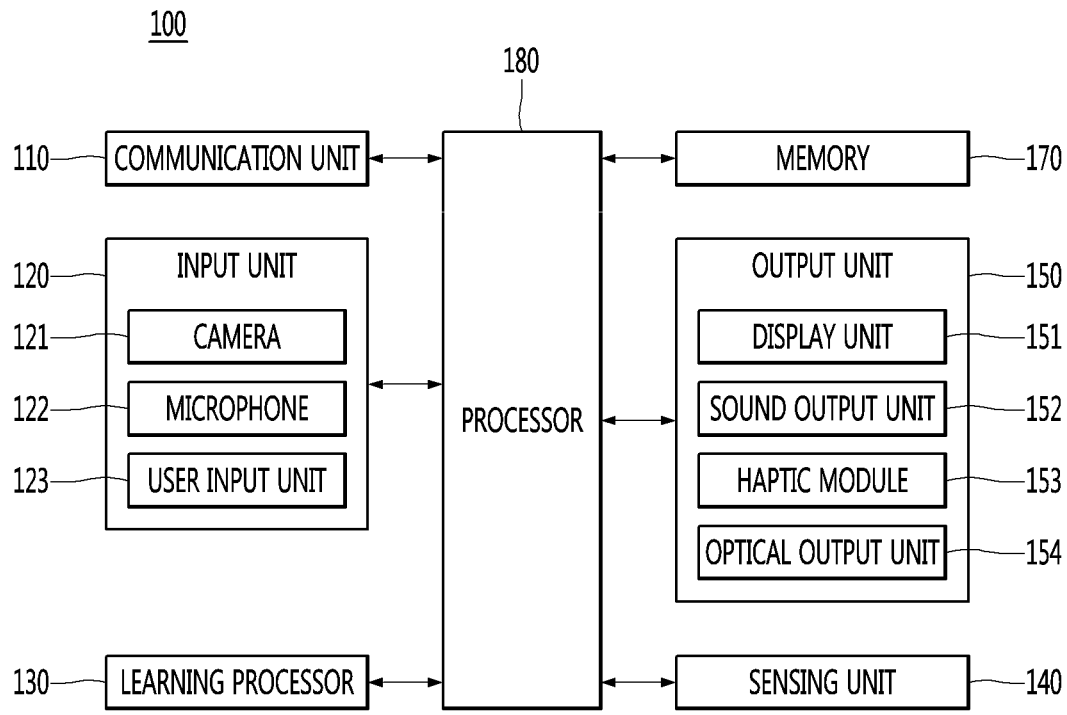
FIG. 4 is a view showing an artificial intelligence (AI) device according to another embodiment of the present invention.

Next, FIG. 4 shows an AI device 100 according to an embodiment of the present invention. A repeated description of FIG. 1 will be omitted. Referring to FIG. 4, an input unit 120 may include a camera 121 for receiving a video signal, a microphone 122 for receiving an audio signal and a user input unit 123 for receiving information from a user.

Audio data or image data collected by the input unit 120 can be analyzed and processed as a control command of the user. Further, the input unit 120 receives video information (or signal), audio information (or signal), data or information received from the user, and the AI device 100 may include one or a plurality of cameras 121 for input of the video information.

Also, the camera 121 processes an image frame such as a still image or a moving image obtained by an image sensor in a video call mode or a shooting mode. The processed image frame can then be displayed on a display unit 151 or stored in a memory 170. In addition, the microphone 122 processes external acoustic signals into electrical sound data, and the processed sound data can be variously utilized according to the function (or the application program) performed in the AI device 100. Various noise removal algorithms for removing noise generated in a process of receiving the external acoustic signal are also applicable to the microphone 122.

In addition, the user input unit 123 receives information from the user. When information is received through the user input unit 123, the processor 180 can control operation of the AI device 100 in correspondence with the input information. Further, the user input unit 123 may include a mechanical input element (or a mechanical key, for example, a button located on a front/rear surface or a side surface of the terminal 100, a dome switch, a jog wheel, a jog switch, and the like) and a touch input element. As one example, the touch input element may be a virtual key, a soft key or a visual key, which is displayed on a touchscreen through software processing, or a touch key located at a portion other than the touchscreen.

As shown, the output unit 150 may include at least one of a display unit 151, a sound output unit 152, a haptic module 153, and an optical output unit 154. In addition, the display unit 151 displays (outputs) information processed in the AI device 100. For example, the display unit 151 can display execution screen information of an application program executing at the AI device 100 or user interface (UI) and graphical user interface (GUI) information according to the execution screen information.

The display unit 151 may also have an inter-layered structure or an integrated structure with a touch sensor so as to implement a touchscreen. Also, the touchscreen can provide an output interface between the terminal 100 and a user, as well as functioning as the user input unit 123 which provides an input interface between the AI device 100 and the user.

Further, the sound output unit 152 can output audio data received from a communication unit 110 or stored in the memory 170 in a call signal reception mode, a call mode, a record mode, a voice recognition mode, a broadcast reception mode, and the like. The sound output unit 152 may include at least one of a receiver, a speaker, a buzzer or the like.

In addition, the haptic module 153 can generate various tactile effects that can be felt by a user. A representative example of tactile effect generated by the haptic module 153 may be vibration. Also, the optical output unit 154 can output a signal indicating event generation using light of a light source of the AI device 100. Examples of events generated in the AI device 100 include a message reception, a call signal reception, a missed call, an alarm, a schedule notice, an email reception, an information reception through an application, and the like.

Figure 5:
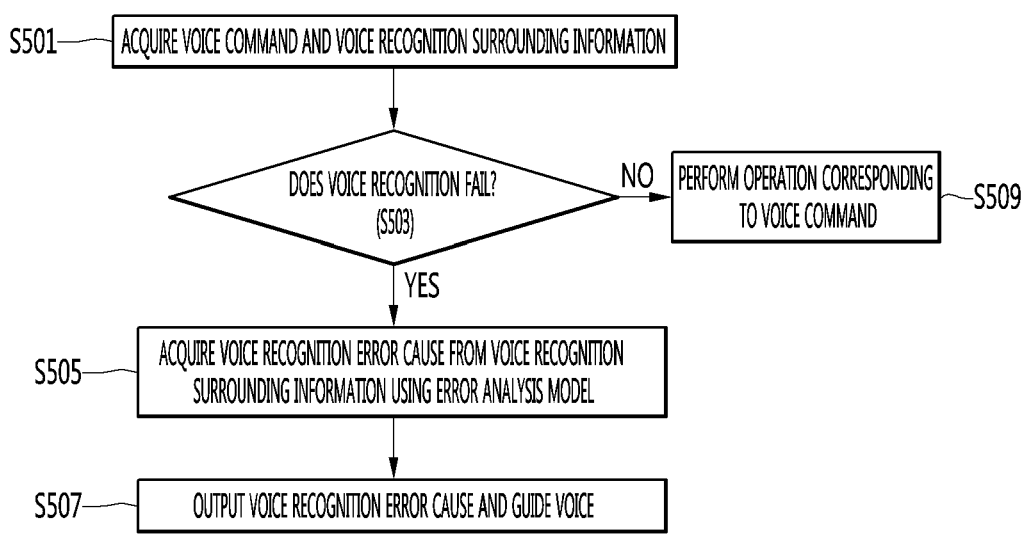
FIG. 5 is a flowchart illustrating a method of operating an artificial intelligence device for notifying a user of a voice recognition error cause according to an embodiment of the present invention.

Next, FIG. 5 is a flowchart illustrating a method of operating an artificial intelligence device for notifying a user of a voice recognition error cause according to an embodiment of the present invention. As shown, the processor 180 acquires a voice command of the user and voice recognition surrounding information (S501).

In one embodiment, the voice recognition surrounding information can be collected when the artificial intelligence device 100 provides a voice recognition service. The voice recognition surrounding information may also include one or more of the magnitude of ambient noise, a distance between the artificial intelligence device 100 and the user, a network environment or a signal-to-noise ratio (SNR).

Further, the network environment may be information indicating a network state between the artificial intelligence device 100 and the AI server 200. The network environment may include one or more of network connection between the artificial intelligence device 100 and the AI server 200 or a response time.

When an intention analysis result of the voice command is not received after the voice command is transmitted to the AI server 200, the processor 180 can determine that network connection with the AI server 200 is not established. The processor 180 can also acquire a difference between a first point in time when the voice command is transmitted to the AI server 200 and a second point in time when the intention analysis result of the voice command is received, as a response time.

In general, the artificial intelligence device 100 can receive the voice command of the user and transmits the voice command to the AI server 200 in order to grasp or determine the intention of the received voice command. The artificial intelligence device 100 can also receive the intention analysis result of the voice command from the AI server 200. That is, when the voice recognition service is provided, if the network environment between the artificial intelligence device 100 and the AI server 200 is bad, voice recognition may not be properly performed.

The reason why the voice recognition surrounding information is also collected when the artificial intelligence device 100 receives the voice command is to determine the error cause of voice recognition. This will be described below.

In more detail, the processor 180 can receive the voice command and ambient noise through the microphone 122. The processor 180 can then divide a voice signal of the voice command and a noise signal of the ambient noise and acquire the magnitude of the ambient noise. Further, the processor 180 can measure the magnitude of the ambient noise and the magnitude of the voice signal and measure the SNR based on the measured magnitudes. Specifically, the SNR means a ratio of the power of the voice signal to the power of the noise signal.

In addition, the processor 180 can measure a distance between the artificial intelligence device 100 and the user through a depth sensor. In more detail, the depth sensor can transmit an infrared signal toward the user and receive a signal reflected from the user. The processor 180 can then measure the distance between the user and the artificial intelligence device 100 using a difference between a point in time when the infrared signal is transmitted and a point in time when the reflected signal is received, and the speed of the infrared signal.

As shown in FIG. 5, the processor 180 determines whether voice recognition of the voice command has failed (S503). The processor 180 can convert the voice signal of the voice command into text using a voice recognition model, for example.

In another example, the processor 180 can transmit the voice signal of the voice command to the AI server 200 through the communication unit 110. In this instance, the AI server 200 can convert the voice signal into text through the voice recognition model. Recognizing the voice signal or the voice command can be used to indicate that the voice signal is converted into text. Further, the voice recognition model may mean a STT (Speech-To-Text) engine, and the memory 170 can store the voice recognition model.

In one embodiment, voice recognition failure of the voice command indicates that the processor 180 cannot convert the voice signal of the voice command into text. In another example, voice recognition failure of the voice command indicates that the voice signal received by the AI server 200 from the artificial intelligence device 100 is not converted into text. In this instance, the artificial intelligence device 100 can receive a message indicating the voice signal is not converted into text from the AI server 200.

Further, the artificial intelligence device 100 can determine that voice recognition has failed through the received message. In another example, even if the voice signal of the voice command is converted into text, the processor 180 can determine that voice recognition has failed when the intention of the text is not acquired. Even if the voice signal is converted into text, when the intention of the converted text is not grasped, the voice recognition service cannot be properly provided.

Upon determining that voice recognition of the voice command has failed, the processor 180 acquires a voice recognition error cause from the voice recognition surrounding information using an error analysis model (S505). In one embodiment, the error analysis model may be a model for analyzing the error cause of voice recognition.

Specifically, the error analysis model may be a model for determining the recognition failure cause of the voice command of the user from the voice recognition surrounding information. The error analysis model may also be an artificial neural network based model learned using a deep learning algorithm or a machine learning algorithm.

Further, the error analysis model may be learned through supervised learning and be trained using the training data set through the learning processor 130 of the artificial intelligence device 100. The error analysis model also may be received/retrieved from the AI server 200 and stored in the memory 170 of the artificial intelligence device 100.

Figures 6, 7:
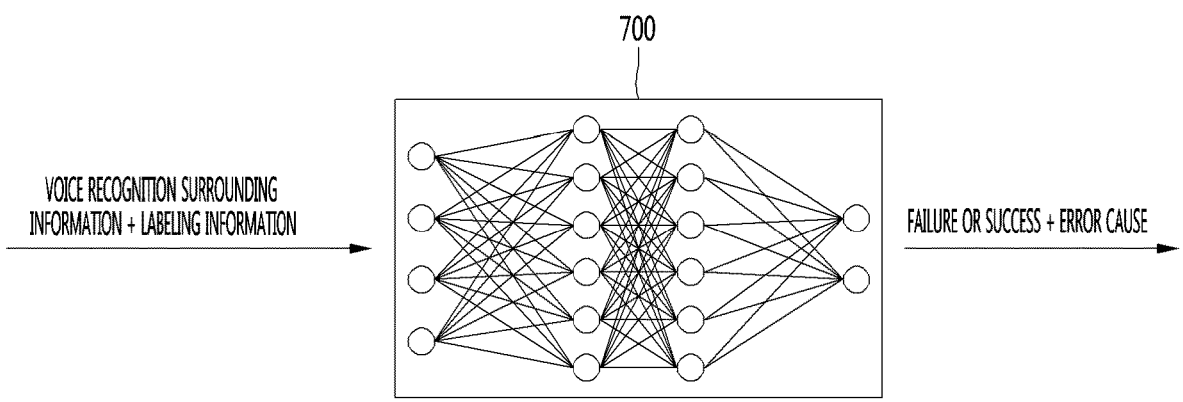
FIG. 6 is a view illustrating a training data set for training an error analysis model according to an embodiment of the present invention.
FIG. 7 is a view illustrating a process of acquiring a voice recognition error cause using an artificial neural network based error analysis model.

Hereinafter, the error analysis model and a process of determining the voice recognition error cause through the error analysis model will be described in detail. In more detail, FIG. 6 is a view illustrating a training data set for training an error analysis model according to an embodiment of the present invention, and FIG. 7 is a view illustrating a process of acquiring a voice recognition error cause using an artificial neural network based error analysis model.

First, FIG. 6 will be described. Referring to FIG. 6, a table 600 including training data sets used to train the error analysis model to determine the voice recognition failure cause is shown. Each training data set may include labeling information labeled with the voice recognition surrounding information.

In more detail, the voice recognition surrounding information may include the distance between the artificial intelligence device 100 and the user, the network environment and the SNR. The labeling information may include information indicating whether voice recognition has failed and the error cause of voice recognition. Information indicating whether voice recognition has failed may be encoded as 0 or 1.

The voice recognition error cause may be expressed by a probability value. As shown in FIG. 6, the first training set 610 may include the voice recognition surrounding information indicating that the distance between the user and the artificial intelligence device 100 is 1 m, the network environment is normal and the SNR is 1, and labeling information indicating failure and ambient noise (a probability value indicating that the cause is ambient noise).

Also, the second training set 630 may include the voice recognition surrounding information indicating that the distance between the user and the artificial intelligence device 100 is 1 m, the network environment is abnormal and the SNR is 10, and labeling information indicating failure and a network environment (a probability value indicating that the cause is a network environment). Further, the error analysis model may be learned through supervised learning using the training data sets shown in FIG. 6. When training of the error analysis model is completed, the parameters of the model may be optimized.

Next, FIG. 7 will be described. Referring to FIG. 7, a process of training the error analysis model 700 composed of an artificial neural network is shown. The error analysis model 700 may be trained with the goal of accurately inferring whether voice recognition has failed and the voice recognition failure cause from the voice recognition surrounding information.

Further, an input feature vector can be extracted from voice recognition surrounding information for learning, and the extracted input feature vector can be input to the error analysis model 700. The error analysis model 700 can then output a result of analyzing whether voice recognition has failed and the error cause as a target feature vector.

In addition, the error analysis model 700 can determine model parameters to minimize a cost function corresponding to a difference between the output target feature vector and the labeling data. Also, the error analysis model 700 can output two or more error causes from the voice recognition surrounding information. That is, the error analysis model 700 can output two error causes having largest probability values among a plurality of error causes.

Referring again to FIG. 5, the processor 180 outputs the acquired error cause of voice recognition and guide voice related to the error cause of voice recognition through the output unit 150 (S507). The processor 180 can output only the error cause through the output unit 150.

Further, the processor 180 can output the error cause and the guide voice through the output unit 150. Also, the memory 170 can store the error cause of voice recognition and the guide voice corresponding to the error cause. That is, when the error cause of voice recognition is acquired through the error analysis model, the processor 180 can extract the guide voice corresponding to the acquired error cause from the memory 170. The processor 180 can also output the extracted guide voice through the display unit 151 or the sound output unit 152.

Figures 8, 9:
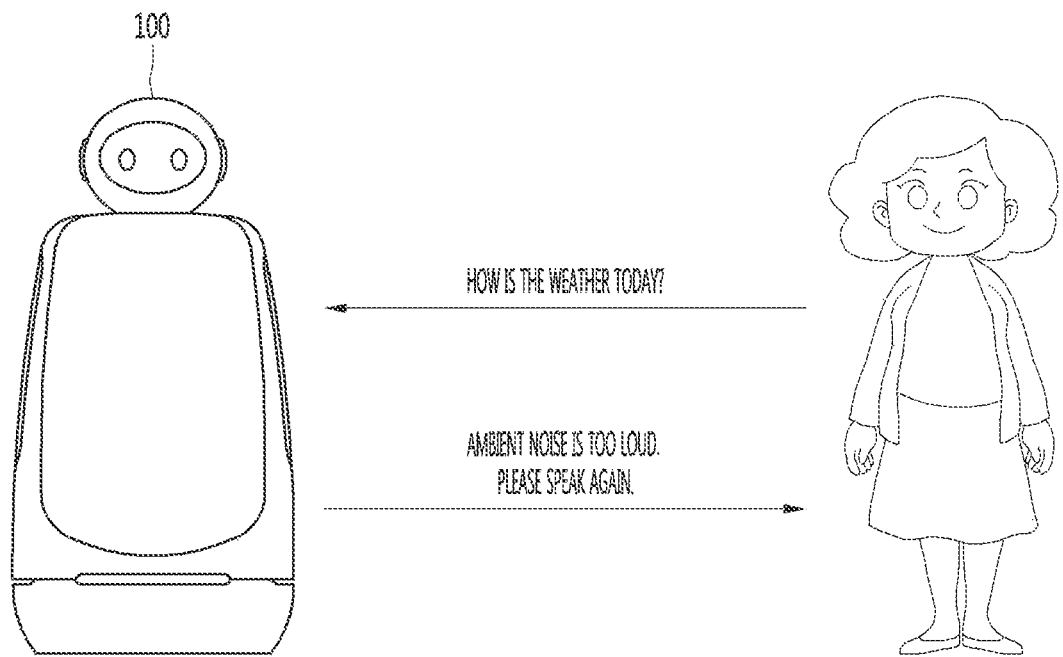
FIG. 8 is a view illustrating a voice guide table in which error causes of voice recognition correspond to guide voices according to an embodiment of the present invention.
FIGS. 9 to 11 are views illustrating an example of providing a voice recognition error cause and outputting guide sound for inducing removal of the error cause.

This will be described with reference to FIG. 8. In particular, FIG. 8 is a view illustrating a voice guide table in which error causes of voice recognition correspond to guide voices according to an embodiment of the present invention. Referring to FIG. 8, a voice guide table is shown, which can be stored in the memory 170.

Further, the voice guide table can be received from the AI server 200 and stored in the memory 170. Also, the voice guide table may include a correspondence relation between the error cause of voice recognition and the guide voice corresponding thereto. For example, when the voice recognition failure cause is ambient noise, the guide voice may include <Ambient noise is too loud. Please speak again>.

When the voice recognition failure cause is a network environment, the guide voice may include <Please check a network connection state>. Also, when the voice recognition failure cause is the distance between the artificial intelligence device 100 and the user, the guide voice may include <The distance between the user and the device is too large. Please speak again at a close range>.

In addition, when the voice recognition error cause is acquired through the error analysis model 700, the processor 180 can extract the guide voice matching the error cause using the voice guide table stored in the memory 170, and audibly output the extracted guide voice through the sound output unit 152. The processor 180 can also display text corresponding to the guide voice through the display unit 151. Further, the processor 180 can audibly output the guide voice through the sound output unit 152 and, at the same time, display the text corresponding to the guide voice on the display unit 151.

Referring again to FIG. 5, upon determining that voice recognition has succeeded, the processor 180 performs an operation corresponding to the voice command (S509). Also, the processor 180 can determine that voice recognition has succeeded when the voice signal of the voice command is converted into text.

Further, the processor 180 can determine that voice recognition has succeeded when the intention of the converted text is acquired. The processor 180 can also determine that voice recognition has succeeded when the intention of the text corresponding to the voice command is received from the AI server 200. In addition, the processor 180 controls the operation of the artificial intelligence device 100 to perform the operation corresponding to the acquired intention of the text.

Figure 10:
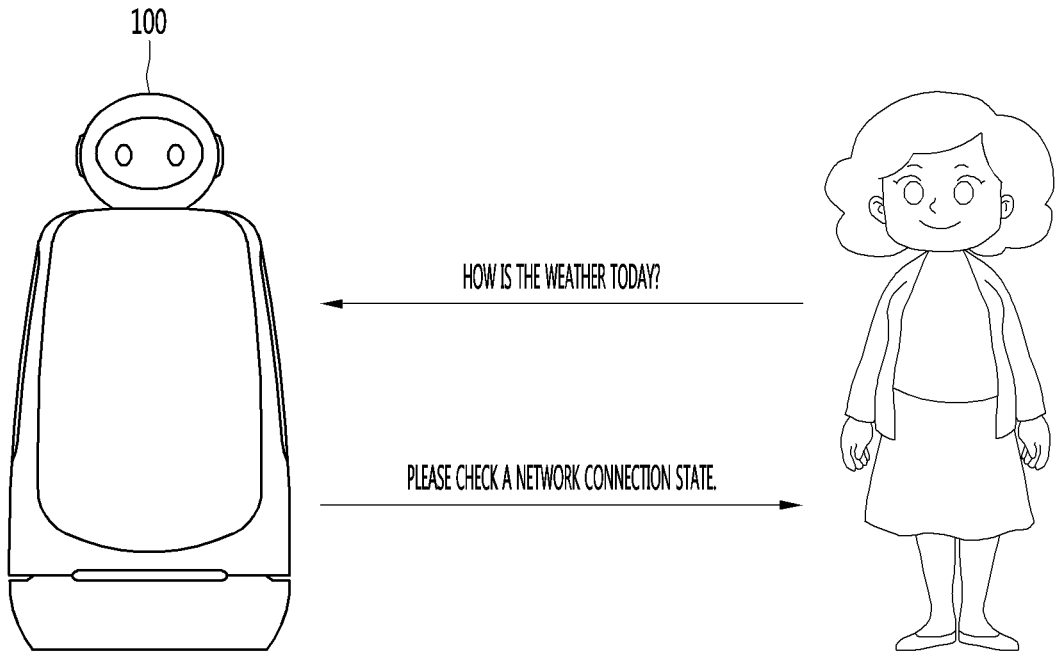
Figure 11:
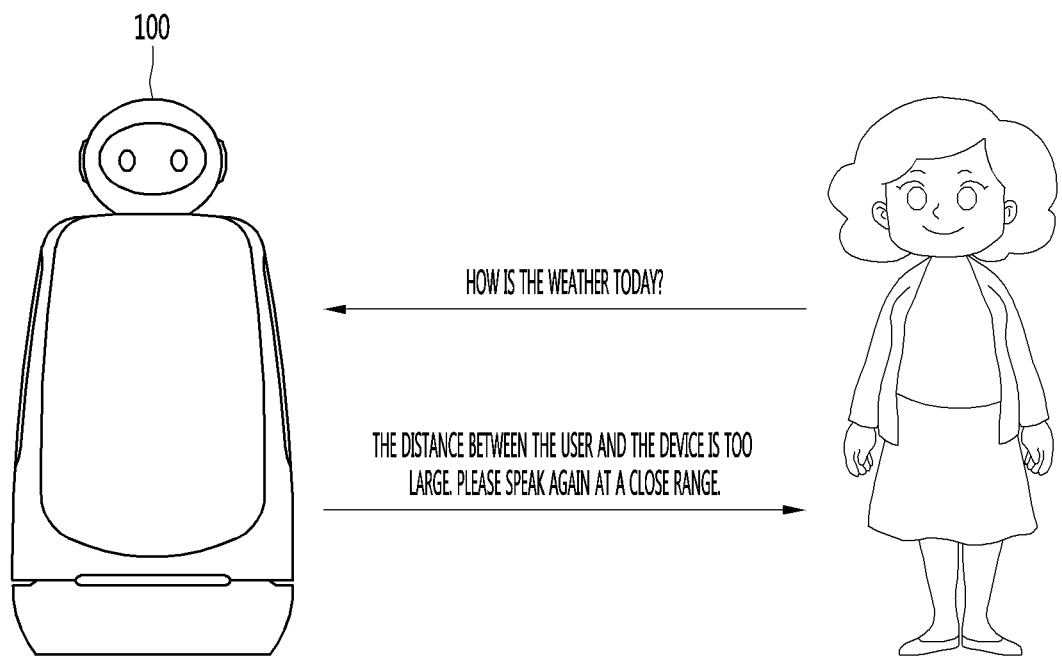

Next, FIGS. 9 to 11 are views illustrating an example of providing a voice recognition error cause and outputting guide sound for inducing removal of the error cause. In FIGS. 9 to 11, assume that the user utters a voice command <How is the weather today?>. In addition, in FIGS. 9 to 11, assume that the artificial intelligence device 100 is a robot capable of providing a voice recognition service.

First, FIG. 9 will be described. As shown, the artificial intelligence device 100 can receive the voice command of the user and determine that the voice recognition error cause is ambient noise using the error analysis model when voice recognition has failed. The artificial intelligence device 100 can then output the voice recognition error cause and guide voice for providing a guide to next utterance. Thus, the user can recognize that ambient noise is the voice recognition failure cause and move to a quiet place or utter the voice command again.

Next, FIG. 10 will be described. As shown, the artificial intelligence device 100 can receive the voice command of the user and determine that the voice recognition error cause is a network environment using the error analysis model when voice recognition has failed. The artificial intelligence device 100 can then output the voice recognition error cause and guide voice for providing a guide to next utterance. Thus, the user can recognize that network environment is the voice recognition failure cause and check the network state of the artificial intelligence device 100.

Next, FIG. 11 will be described. As shown, the artificial intelligence device 100 can receive the voice command of the user and determine that the voice recognition error cause is a distance between the artificial intelligence device 100 and the user using the error analysis model when voice recognition has failed. The artificial intelligence device 100 can then output the voice recognition error cause and guide voice for guiding next utterance. Thus, the user may recognize that the distance from the artificial intelligence device 100 is too large, and move to be close to the artificial intelligence device 100 and utter the voice command again.

According to the embodiment of the present invention, when voice recognition has failed, the artificial intelligence device 100 provides the voice recognition error cause and informs the user of why the error occurs. In addition, the user is guided to take action to correct the voice recognition error. Therefore, the user can immediately grasp the voice recognition error cause and more efficiently receive voice recognition service according to action to solve the error cause.

The present invention mentioned in the foregoing description can also be embodied as computer readable codes on a computer-readable recording medium. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, etc. The computer may include the controller 180 of the AI device.

What is claimed is:

1. An artificial intelligence device for providing a voice recognition service, the artificial intelligence device comprising:
    a microphone configured to receive a voice command;
    a memory configured to store an error analysis model for inferring an error cause of voice recognition;
    an output unit; and
    a processor configured to:
    determine whether voice recognition of the voice command has failed based on the voice command and voice recognition surrounding information,
    acquire the error cause from the voice recognition surrounding information using the error analysis model, and
    control the output unit to output the acquired error cause and a guide voice for inducing removal of the error cause,
    wherein the voice recognition surrounding information includes a signal-to-noise ratio indicating a ratio of power of a voice signal of the voice command to power of a noise signal, a network environment including one or more of a network connection state or a response time, and a distance between the artificial intelligence device and a user giving the voice command.

2. The artificial intelligence device of claim 1, wherein the voice command is uttered by a user near the artificial intelligence device to command the artificial intelligence device to perform an operation.

3. The artificial intelligence device of claim 1, wherein the error analysis model is an artificial neural network learned by a deep learning algorithm or a machine learning algorithm.

4. The artificial intelligence device of claim 3, wherein the error analysis model is learned through supervised learning, and
wherein a training data set used to train the error analysis model includes the voice recognition surrounding information, failure or success labeled therewith and the error cause.

5. The artificial intelligence device of claim 1, wherein the memory is further configured to store a voice guide table including a plurality of error causes and a plurality of guide voices respectively corresponding to the plurality of error causes, and wherein the processor is further configured to control the output unit to output a corresponding guide voice from the voice guide table that corresponds to the acquired error cause along with the error cause.

6. The artificial intelligence device of claim 1, further comprising:
a communication unit configured to perform communication with an artificial intelligence server,
wherein the processor is further configured to receive the error analysis model from the artificial intelligence server and store the error analysis model in the memory.

7. The artificial intelligence device of claim 1, wherein the processor is further configured to determine that the voice recognition has failed when a voice signal of the voice command is not converted into text.

8. The artificial intelligence device of claim 1, wherein the processor is further configured to determine that the voice recognition has failed when a voice signal of the voice command is converted into text and an intention of the converted text is not determined.

9. The artificial intelligence device of claim 1, wherein the processor is further configured to:
acquire an intention of the voice command, and
perform an operation corresponding to the acquired intention, when the voice recognition of the voice command has succeeded.

10. A method of operating an artificial intelligence device for providing a voice recognition service, the method comprising:
acquiring, via a microphone included in the artificial intelligence device, a voice command and voice recognition surrounding information;
determining, via a processor included in the artificial intelligence device, whether voice recognition of the voice command has failed;
acquiring, via the processor, an error cause from the voice recognition surrounding information using an error analysis model for inferring an error cause of voice recognition, when the voice recognition has failed; and
outputting, via an output unit included in the artificial intelligence device, the acquired error cause and a guide voice for inducing removal of the error cause,
wherein the voice recognition surrounding information includes a signal-to-noise ratio indicating a ratio of power of a voice signal of the voice command to power of a noise signal, a network environment including one or more of a network connection state or a response time, and a distance between the artificial intelligence device and a user giving the voice command.

11. The method of claim 10, wherein the voice command is uttered by a user near the artificial intelligence device to command the artificial intelligence device to perform an operation.

12. The method of claim 10, wherein the error analysis model is an artificial neural network learned by a deep learning algorithm or a machine learning algorithm.

13. The method of claim 12, wherein the error analysis model is learned through supervised learning, and
wherein a training data set used to train the error analysis model includes the voice recognition surrounding information, failure or success labeled therewith and the error cause.

14. The method of claim 10, further comprising:
storing a voice guide table including a plurality of error causes and a plurality of guide voices respectively corresponding to the plurality of error causes,
wherein the outputting comprises outputting a corresponding guide voice from the voice guide table that corresponds to the acquired error cause along with the error cause.

15. The method of claim 10, further comprising:
receiving, via a communication unit included in the artificial intelligence device, the error analysis model from an artificial intelligence server; and
storing the error analysis model in a memory.

16. The method of claim 10, wherein the voice recognition is determined to have failed when a voice signal of the voice command is not converted into text.

17. The method of claim 10, wherein the voice recognition is determined to have failed when a voice signal of the voice command is converted into text and an intention of the converted text is not determined.

18. The method of claim 10, further comprising:
acquiring an intention of the voice command; and
performing an operation corresponding to the acquired intention, when the voice recognition of the voice command has succeeded.

* * * * *